UNITED STATES PATENT OFFICE.

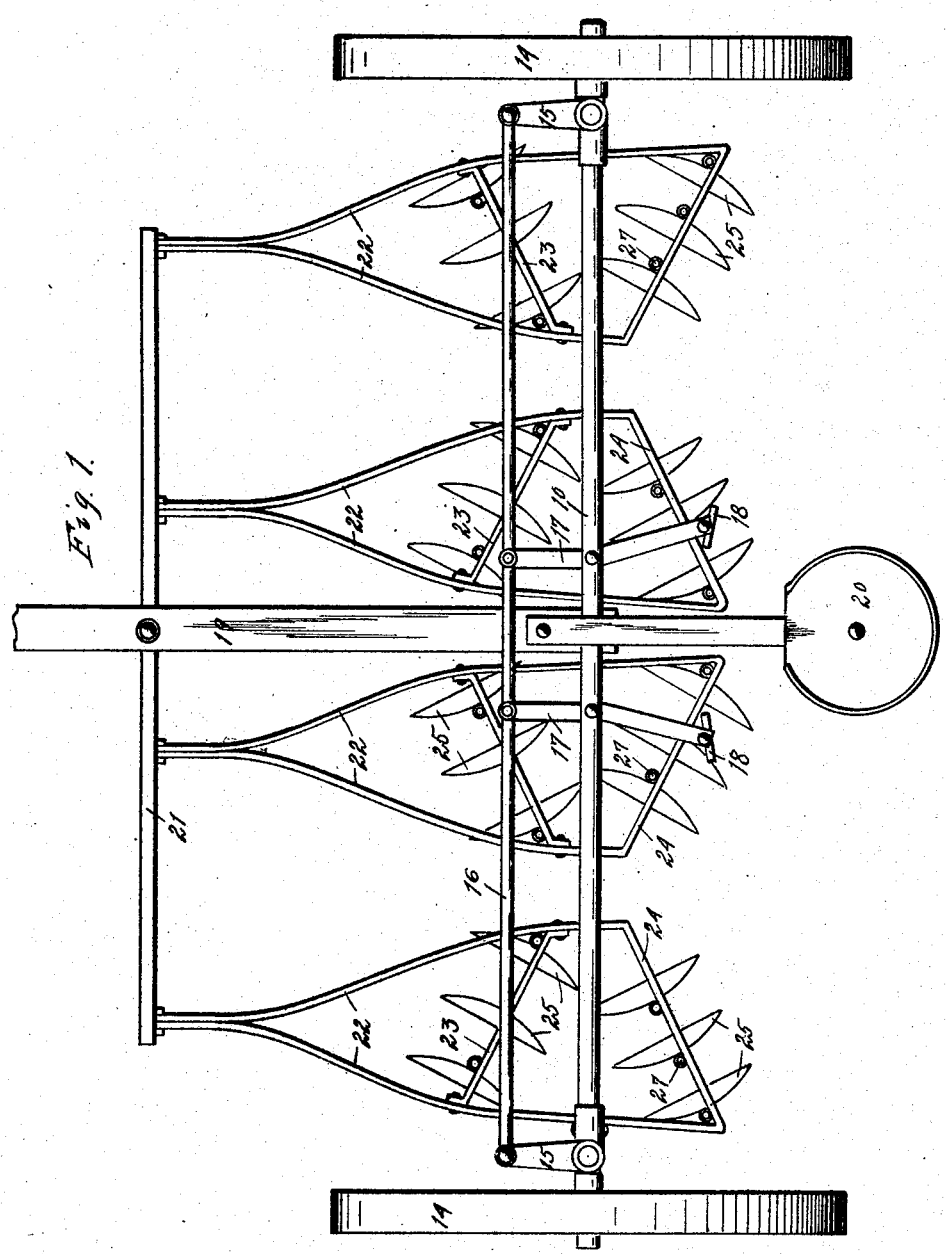

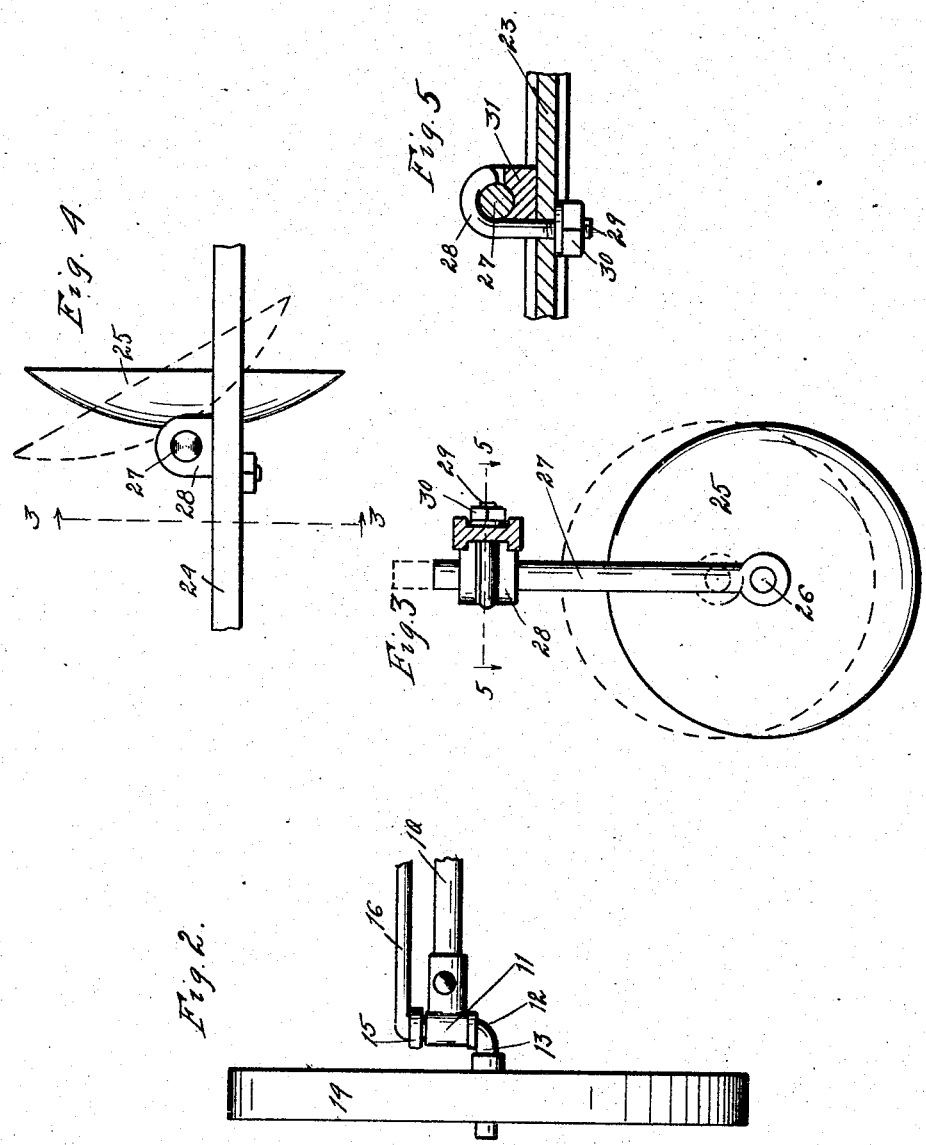

ANDREW ADDISON, OF TRAER, IOWA.

DISK CULTIVATOR.

1,183,840.  Specification of Letters Patent.  Patented May 23, 1916.

Application filed March 11, 1915. Serial No. 13,738.

*To all whom it may concern:*

Be it known that I, ANDREW ADDISON, a citizen of the United States, and resident of Traer, in the county of Tama and State of Iowa, have invented a certain new and useful Disk Cultivator, of which the following is a specification.

The object of my invention is to provide a disk cultivator of simple, durable and inexpensive construction.

A further object is to provide a disk cultivator so constructed and arranged as to permit cultivation reasonably close to a row of corn or the like without cutting the corn roots.

A further object is to provide such a cultivator so constructed as to permit the land to be cultivated and left in substantially level condition without a ridge or a ditch next to the corn or in the middle of the row.

Still a further object is to provide such a cultivator having the disk so mounted as to permit adjustment, whereby after cultivation, the land can be left in practically any desired condition, either substantially level or inclined toward or from the hills.

My invention consists in the construction, arrangement, and combination of the various parts of the device, whereby the objects contemplated are attained as hereinafter more fully set forth, pointed out in my claims and illustrated in the accompanying drawings, in which:

Figure 1 shows a top or plan view of a cultivator embodying my invention. Fig. 2 shows a rear elevation of one of the wheels. Fig. 3 shows a side elevation of one of the disks illustrating the method of mounting the same on the supporting bar, taken on the line 3—3 of Fig. 4. Fig. 4 shows a top or plan view of one of the disks, and Fig. 5 shows a detail sectional view taken on the line 5—5 of Fig. 3.

In the exemplification of my invention, illustrated in the accompanying drawings, I have used the reference numeral 10 to indicate generally a transverse frame member having at its ends the bearings 11. Mounted in the bearings 11 are shafts 12, having at their lower ends the right angled spindles 13, on which the wheels 14 are rotatably mounted.

On the upper ends of the member 11 are forwardly extending arms 15, each of which is pivoted to one end of a transverse rod 16. Pivoted to the rod 16, near the central portion thereof, are spaced rearwardly extending levers 17. The levers 17 are pivoted between their ends on the transverse frame member 10, and have the foot rests 18 at their rear ends. A longitudinal frame member 19 supports a seat 20, suitably mounted to permit the driver to control the levers 17 with his feet.

Spaced from the frame member 10 at a suitable distance in front of said member, is a frame member 21. Supported on the members 21 and 10 are a plurality of frame members 22. Bolted or otherwise suitably connected to the frame members 22 are bars 23. As shown in Fig. 1, my improved cultivator is built for cultivating two rows of corn or the like.

In such a cultivator, there are four sets of the frame members 22. The bars 23 of the end members are inclined from their outer ends inwardly and rearwardly, as clearly illustrated in Fig. 1. The two middle bar members 23 are inclined from their inner ends outwardly and rearwardly, as illustrated in said figure.

The rear ends of each pair of members 22 are connected by bars 24. The two outer bars 24, located rearwardly of the two outer bars 23, are inclined from their upper ends inwardly and forwardly. The two middle bars 24, in the rear of the middle bars 23, are inclined from their inner ends outwardly and forwardly. The two outer pairs of frame members 22 are spaced from the respective adjacent inner pairs of frame members 22. The two middle pairs of frame members 22 are adapted to travel between two rows of corn or the like.

I provide a plurality of disks 25 mounted on spindles 26, on which are upwardly extending shanks 27 mounted in yokes or brackets 28, which have bolt members 29 formed thereon and extended through the bars 23 or 24 as the case may be, and held in position by nuts 30. Spaced blocks 31 engage the bars 23 or 24 as the case may be and the inner surfaces of the shanks 27. It will readily be seen that by loosening the nuts 30 the shanks 27 may be moved longitudinally or rotated for securing the disks in a great variety of positions with relation to the bars on which they are mounted.

In the practical operation of my improved disk cultivator, it will be noticed that one section of the disks travels behind another section, as illustrated in Fig. 1.

With the ordinary disk cultivator considerable difficulty is experienced due to the fact that the cultivator lacks flexibility of control, whereby the land can be left in any condition desired. The disks are so arranged that the disks of the front sections have their cutting edges placed farthest from the rows for causing as little injury as possible to the roots of the corn or the like. It will readily be seen that with the disk, set in position as shown in Fig. 1, the forward disks will loosen the dirt and throw it away from the corn rows, while the rearward sections of the disks will throw the dirt back, leaving it substantially level and thoroughly stirred.

Where an ordinary disk is used, if only the front sections were used, as shown in Fig. 1, a ditch would be made next to the corn row, and on side hills or inclined ground, rain would wash along this ditch and uncover the roots. This difficulty is avoided by the use of the double sections. On the other hand it is, in many instances, undesirable to make a ridge along the corn row, and yet with a disk plow having the disks arranged like my rearward sections, it is impossible to plow the corn without making a ridge along the row. While it is possible, with a disk arranged like mine to leave the ground substantially level, it is also possible to ridge the ground along the row and to ridge it in the center thereby giving the possibility for a variety of cultivation, not attained with other disks.

It will be seen that by properly adjusting the various disks 25, practically any lay can be given to the cultivated ground. With many disks it is necessary to go through the corn twice in order to put the ground in the proper condition, while in my disk a single cultivation will put the ground in the condition desired.

My disk is especially advantageous where it is desired to cut up and stir the dirt and leave a loose mulch on top without leaving any grooves or ridges. It is believed that this is the only disk where the ground can be left in this condition after one plowing.

My device can readily be adapted for use as a one row wheel dodge cultivator.

It will be understood that some changes may be made in the construction, and arrangement of my improved disk cultivator, without departing from its essential features and purposes and it is my intent to cover by this application any such changes which my be included within the scope of my claims.

I claim as my invention:—

1. In a disk cultivator, spaced transverse frame members, angularly adjustable wheels mounted on the rearward of said members, four transversely spaced frame units secured at their forward ends to the forward transverse frame member and extending rearwardly in the machine and having diverging portions secured to said transverse frame member, each outer unit having a forward frame member connecting the sides of the unit and inclined from their inner ends forwardly and outwardly, and having rearward frame members connecting the sides of said unit and extending from their inner ends rearwardly and outwardly, the two inner frame units having forward frame members connecting their sides and extending from their ends rearwardly and outwardly, and having rearward frame units connecting their sides and extending from their inner ends forwardly and outwardly, disks on the forward inclined frame members of the outer units and on the rearward inclined members of the inner unit arranged to throw dirt outwardly, disks on the rearward inclined members of the inner unit for throwing dirt inwardly, the two outer units being spaced from the two inner units to pass on opposite sides of rows of corn.

2. In a disk cultivator, spaced transverse frame members, angularly adjustable wheels mounted on the rearward of said members, four transversely spaced frame units secured at their forward ends to the forward transverse frame member and extending rearwardly in the machine and having diverging portions secured to said transverse frame member, each outer unit having a forward frame member connecting the sides of the unit and inclined from their inner ends forwardly and outwardly, and having rearward frame members connecting the sides of said unit and extending from their inner ends rearwardly and outwardly, the two inner frame units having forward frame members connecting their sides and extending from their ends rearwardly and outwardly, and having rearward frame units connecting their sides and extending from their inner ends forwardly and outwardly, disks on the forward inclined frame members of the outer units and on the rearward inclined members of the inner unit arranged to throw dirt outwardly, disks on the rearward inclined members of the outer unit and on the forward inclined members of the inner unit for throwing dirt inwardly, the two outer units being spaced from the two inner units to pass on opposite sides of rows of corn.

Des Moines, Iowa, February 24, 1915.

ANDREW ADDISON.

Witnesses:
ARTHUR THOMAS,
B. FRANK THOMAS.

Copies of this patent may be obtained for five cents each, by addressing the "Commissioner of Patents, Washington, D. C."